(No Model.)

O. HAMMERSTEIN.
FIREPROOF FLOOR.

No. 550,612. Patented Dec. 3, 1895.

WITNESSES:
Edmund A. Frans E.
Geo. E. Morse.

INVENTOR
Oscar Hammerstein,
BY Briesen & Knauth
his ATTORNEYS.

UNITED STATES PATENT OFFICE.

OSCAR HAMMERSTEIN, OF NEW YORK, N. Y.

FIREPROOF FLOOR.

SPECIFICATION forming part of Letters Patent No. 550,612, dated December 3, 1895.

Application filed May 8, 1895. Serial No. 548,516. (No model.)

*To all whom it may concern:*

Be it known that I, OSCAR HAMMERSTEIN, a resident of the city, county, and State of New York, have invented certain new and useful Improvements in Fireproof Floors, of which the following is a specification.

My invention relates to fireproof floors, and has for its object to produce a floor or partition which shall be fireproof and at the same time strong and cheaply constructed.

To this end my invention consists in the construction hereinafter set forth and claimed.

My invention will be understood by reference to the accompanying drawings, in which—

Figure 1:
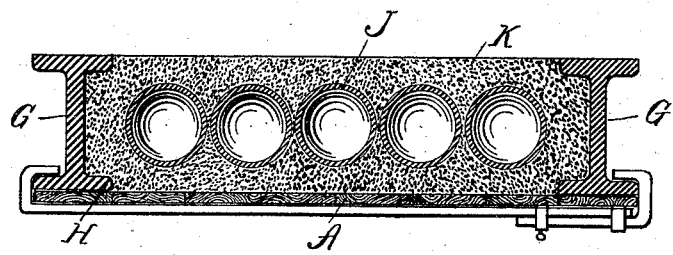
Figure 2:
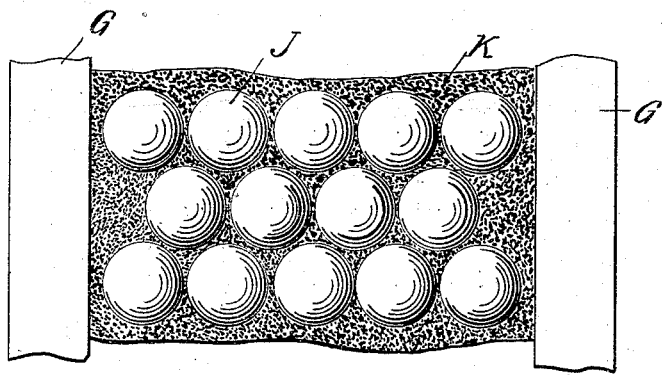
Figure 3:
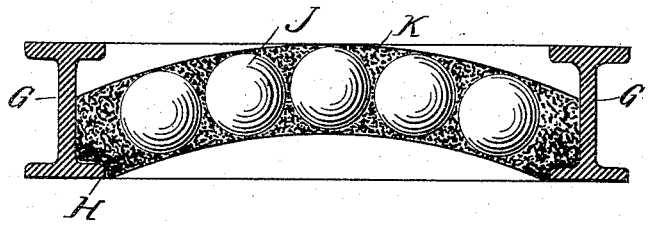

Figure 1 is a section through a floor or floor-section constructed in accordance with my invention. Fig. 2 is a plan view thereof. Fig. 3 is a sectional view of a modification, the same representing a floor-arch.

Referring particularly to Figs. 1 and 2, G G are supporting-beams for the flooring, preferably I-beams, as shown.

J are a series of globular hollow bodies, by which term I wish to also include spheroidal, egg-shaped, and other hollow bodies of analogous form.

K is a filling, of cement or other analogous material, which is placed around the globular bodies and allowed to set, completely embracing the same.

The preferred mode of constructing my flooring is as follows: The centering A is first put in place and covered with a portion of the filling. The globular hollow bodies J are then put in place and the remainder of the filling put in, the filling coming between the interstices between the globular bodies and preferably entirely covering them, the globular bodies being, by preference, of less diameter than the thickness through the floor.

In Fig. 3 the construction is in all respects similar to that shown in Figs. 1 and 2, with the exception that instead of being a flat arch the arch in the present construction is rounded in the usual manner.

It will be quite obvious that the main idea of using the globular hollow bodies is on the score of economy. Consequently these globular hollow bodies may be of any suitable material which will retain its shape until the plastic filling is in place, the function thereof being to save filling.

I am well aware that it has been proposed to construct floors with cement set around cylinders running the entire length of the flooring, and I do not claim such construction; but

What I claim, and desire to secure by Letters Patent, is—

1. In a floor or partition, the combination of supporting beams, a filling between the beams and globular hollow bodies in the filling, substantially as described.

2. The combination of globular hollow bodies with a plastic filling, the said hollow bodies being entirely surrounded by the plastic filling, substantially as described.

OSCAR HAMMERSTEIN.

Witnesses:
CHARLES E. SMITH,
MAURICE BLOCK.